United States Patent
Sylvain

(10) Patent No.: US 7,286,467 B1
(45) Date of Patent: Oct. 23, 2007

(54) FAILURE PROTECTION FOR PACKET TELEPHONY

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 1162 days.

(21) Appl. No.: 10/194,114

(22) Filed: Jul. 12, 2002

(51) Int. Cl.
*H04J 1/16* (2006.01)

(52) U.S. Cl. ............ 370/216; 370/386; 370/401; 709/221; 709/231

(58) Field of Classification Search ........ 370/238, 370/242–248, 486–490, 216, 217–220, 228, 370/400, 401, 352, 386; 709/203, 238–242, 709/220, 221, 231; 719/328
See application file for complete search history.

(56) References Cited

U.S. PATENT DOCUMENTS 6,195,680 B1 * 2/2001 Goldszmidt et al. ........ 709/203
6,542,499 B1 * 4/2003 Murphy et al. ............. 370/352
2006/0112400 A1 * 5/2006 Zhang et al. ............... 719/328

* cited by examiner

*Primary Examiner*—John Pezzlo
(74) *Attorney, Agent, or Firm*—Withrow & Terranova, PLLC

(57) ABSTRACT

The present invention provides a fail-over architecture for packet telephony applications. A media gateway is configured to have at least two interfaces, each of which is associated with a communication path. The communication paths are isolated from one another as much as possible, and may each be used to facilitate the transfer of packets for a communication session. The fail-over process implemented by the gateway includes receiving packets from a remote gateway, and when an interruption in incoming packets occurs, switching to another communication path for both transmission and reception of packets to facilitate the communication session with the remote gateway. As such, an interruption in packets due to a failure in a primary communication path results in both gateways automatically switching to a redundant communication path to support the communication session.

32 Claims, 8 Drawing Sheets

FAILURE PROTECTION FOR PACKET TELEPHONY

FIELD OF THE INVENTION

The present invention relates to telecommunications, and in particular to ensuring fast recovery following failures in packet telephony networks.

BACKGROUND OF THE INVENTION

There is a growing interest in the convergence of the public switched telephone network (PSTN), the Internet and other internets and intranets. The convergence of these networks requires technology that facilitates interworking in a uniform and effective manner. The next generation of unified networks will provide an open and scalable architecture to accommodate multiple vendors and protocols under a common packet network. At the moment, there are several obstacles to providing telephony services on a packet network with the same level of performance and availability as is available on the PSTN today.

The traditional PSTN provides constant bandwidth streams of information between users. These media streams travel over dedicated circuits, which have proven to be very reliable and capable of recovering from various failures in a fast and uninterrupting manner. On the other hand, packet networks have been prone to packet loss and delays, which affect the quality of streaming media required to carry voice communications. Given the high quality levels associated with the PSTN, subscribers expect and demand traditional quality regardless of the transmission medium. Further, packet telephony applications are prone to excessive delays when recovering from communication or network failures.

Given the desire to use packet networks as the centerpiece for telephony communications, there is a need for a way to ensure quality of service levels for telephony communication carried at least in part over packet networks and provide fast and effective recovery in response to network failures.

SUMMARY OF THE INVENTION

The present invention provides a fail-over architecture for packet telephony applications. A media gateway is configured to have at least two interfaces, each of which is associated with a communication path. The communication paths are isolated from one another as much as possible, and may each be used to facilitate the transfer of packets for a single communication session. The fail-over process implemented by the gateway includes receiving packets from a remote gateway, and when an interruption in incoming packets occurs, switching to another communication path for both transmission and reception of packets to facilitate the communication session with the remote gateway. As such, an interruption in packets due to a failure in a primary communication path results in both gateways automatically switching to a redundant communication path to support the communication session.

Preferably, the gateways will cooperate with one another to synchronize the reception and transmission of packets onto a single communication path. The gateway monitors the various communication paths for incoming packets, and the path having the incoming packets is used for the transmission of packets. In one embodiment, the gateway will make sure a set number of consecutive packets is received prior to making the determination to use a select communication path for transmission. The communication paths are preferably supported by a virtual path created by an MPLS or an ATM permanent virtual circuit.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides redundant communication paths, which are isolated from one another, between two gateways. Initially, the gateways will synchronize to facilitate communications on a primary path. When a failure occurs in streaming communications, each gateway will detect a break in the incoming packets and immediately begin transmitting and attempting to receive packets over a redundant path for a given communication session. When the first gateway stops transmitting on the primary path and begins transmitting on the redundant path, the second gateway will detect the break in packets being transmitted by the first gateway either because of the stoppage in transmission or the failure in the path, and will begin transmitting and receiving packets on the redundant path. Thus, each gateway fails over to the redundant path and remains synchronized on that path. The steaming media may include video conferencing, audio streaming, video streaming, information streaming, voicemail, gaming, advertising, and screen sharing applications.

Figure 1:
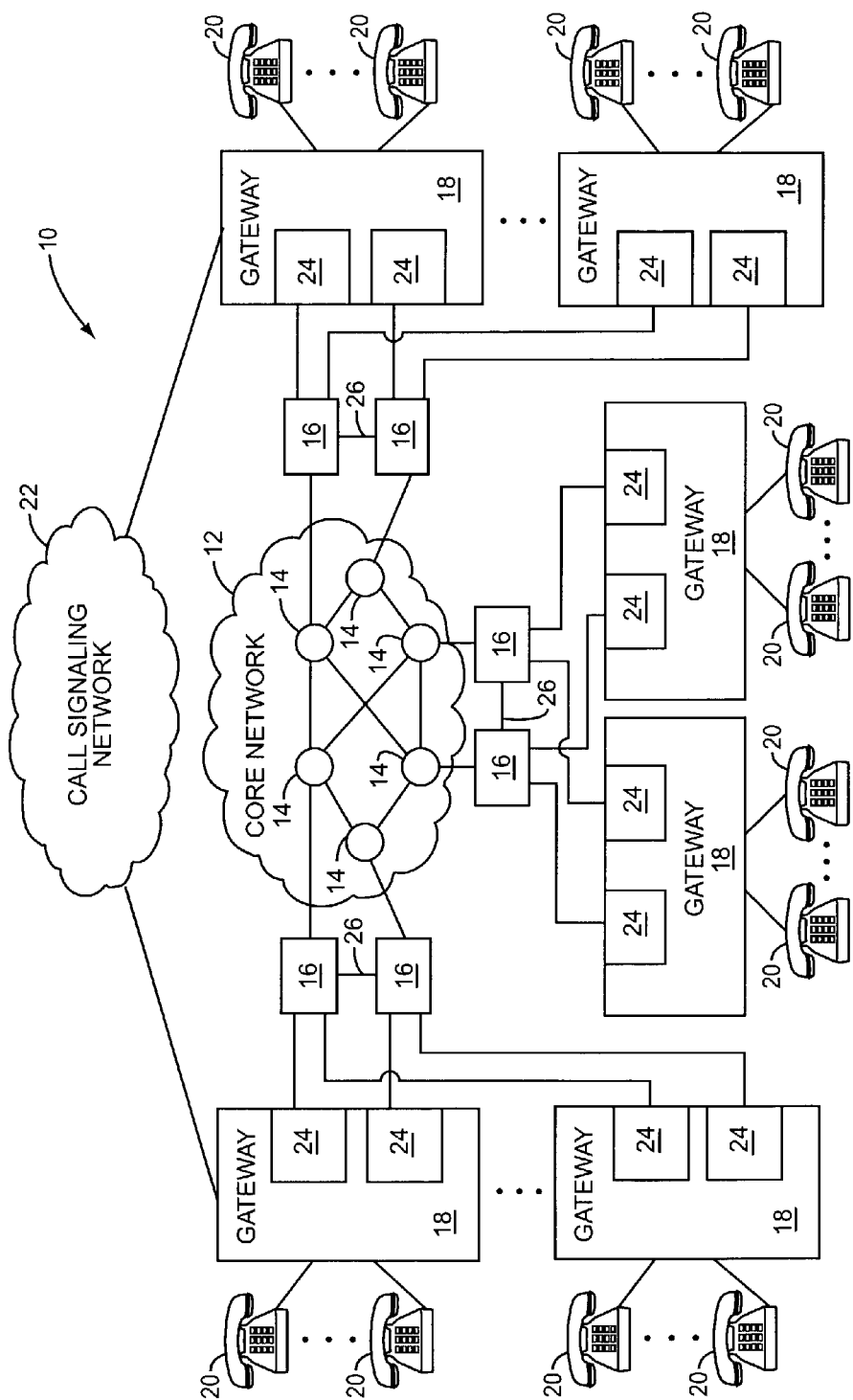
FIG. 1 is a block representation of a communication network infrastructure according to one embodiment of the present invention.

With reference to FIG. 1, a communication environment 10 is centered about a core packet network 12 having numerous routers 14 interconnected to facilitate the routing of packets between edge routers 16. The edge routers 16 act as the ingress and egress points for any number of associated media gateways 18 to the core network 12. The media gateways 18 provide a packet interface for circuit-switched telephony devices, such as telephones 20. Media gateway controllers (not shown) are provided in a call signaling network 22 and effectively control groups of media gateways 18. For the present invention, the media gateways 18 have multiple communication interfaces 24 supporting communications over redundant paths. The media gateway controllers may communicate with each other to facilitate call control between media gateways 18, or may cooperate with the call control entities of an intelligent network (IN) of the public switched telephone network (PSTN). Further, cross links 26 may be provided to facilitate temporary redirection of traffic between associated routers 16 in case there is a failure on the portion of either of the redundant paths connecting one router 16 and an interface 24 of the gateway 18. Preferably, a pair of edge routers 16 is used to support a cluster of gateways 18 wherein each interface 24 is associated one of the pair of edge routers 16. Alternatively, one edge router 16 may be configured with redundant, carrier grade interfaces capable of providing the fail-over protection described in further detail below.

To facilitate interworking of circuit-switched and packet communications, there are two primary elements: a media gateway 18 and a media gateway controller. The media gateway 18 provides the actual interface between the packet network associated with an edge router 16 and the telephony devices, such as telephones 20 or circuit-switched telephony interfaces such as TDM trunks (not shown). The media gateway controller provides decision-making and coordination between media gateways 18 to facilitate interworking, alone or in association with other media gateway controllers in the call signaling network 22 or the call control services of the PSTN.

The primary responsibility of a media gateway 18 is to allow traditional telephony media, such as voice, to be transported in a packet network using an Internet Protocol (IP) format, asynchronous transfer mode (ATM) format, or the like. The media gateways 18 allow media to move without loss of integrity or quality between networks and network technologies. In essence, the media gateways 18 provide bi-directional interfaces between disparate networks, and typically, between a traditional circuit-switched telephony network and a packet network.

For the purpose of describing the preferred embodiments of the present invention, the following description assumes the media gateways 18 provide bi-directional interfaces between circuit-switched networks, such as the TDM-based PSTN devices or networks, and packet networks coupled to the edge routers 16. For example, a media gateway 18 may implement high-speed TDM trunk interfaces or line interfaces, which are commonly used interfaces between switching elements in a circuit-switched network.

The primary responsibilities of the media gateway controllers are to make decisions based on flow-related information and to provide instructions on interconnecting elements or endpoints within and throughout the networks. Media gateway controllers store status information on media flows and may be used to generate administrative records for a variety of media-related activities, such as billing. Most prominently, media gateway controllers provide coordination of media gateways 18. Typically, media gateway controllers direct media gateways 18 to set up, handle, and end individual media flows, which will take place between the respective media gateways 18.

Figure 2:
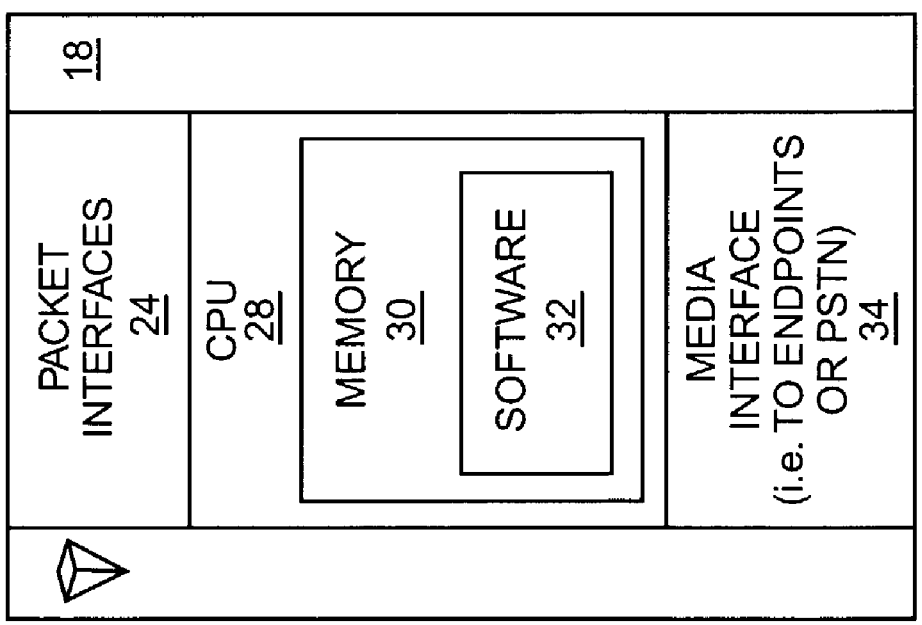
FIG. 2 is a block representation of a gateway according to one embodiment of the present invention.

Turning now to FIG. 2, a block schematic of a media gateway 18 is shown having a CPU 28 containing memory 30 and the requisite software 32 for operation. The CPU 28 operates to provide a bi-directional interface between one or more packet interfaces 24 and the media interface 34. The media interface 34 is the interface opposite the packet network, and is preferably a circuit-switched interface supporting traditional trunks and lines of a traditional, circuit-switched telephone network. When interfacing with traditional telephony equipment, the media interface 34 is typically configured to handle TDM communications or any other analog or digital data streams required to facilitate such communications. As illustrated in FIG. 1, the media interface 34 may be a line interface supporting a telephone 20.

Figure 3:
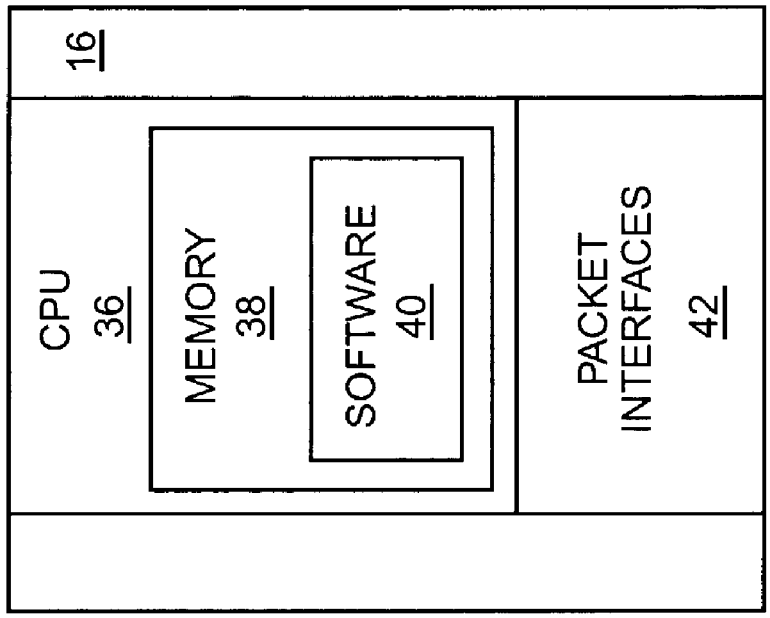
FIG. 3 is a block representation of an edge router according to one embodiment of the present invention.

FIG. 3 is a block schematic of an edge router 16 having a CPU 36 with associated memory 38 and the requisite software 40 for operation. The edge router 16 will have packet interfaces 42 capable of communicating with the associated media gateways 18 as well as the routers 14 in the core network 12 as will be described below in greater detail.

Figure 4:
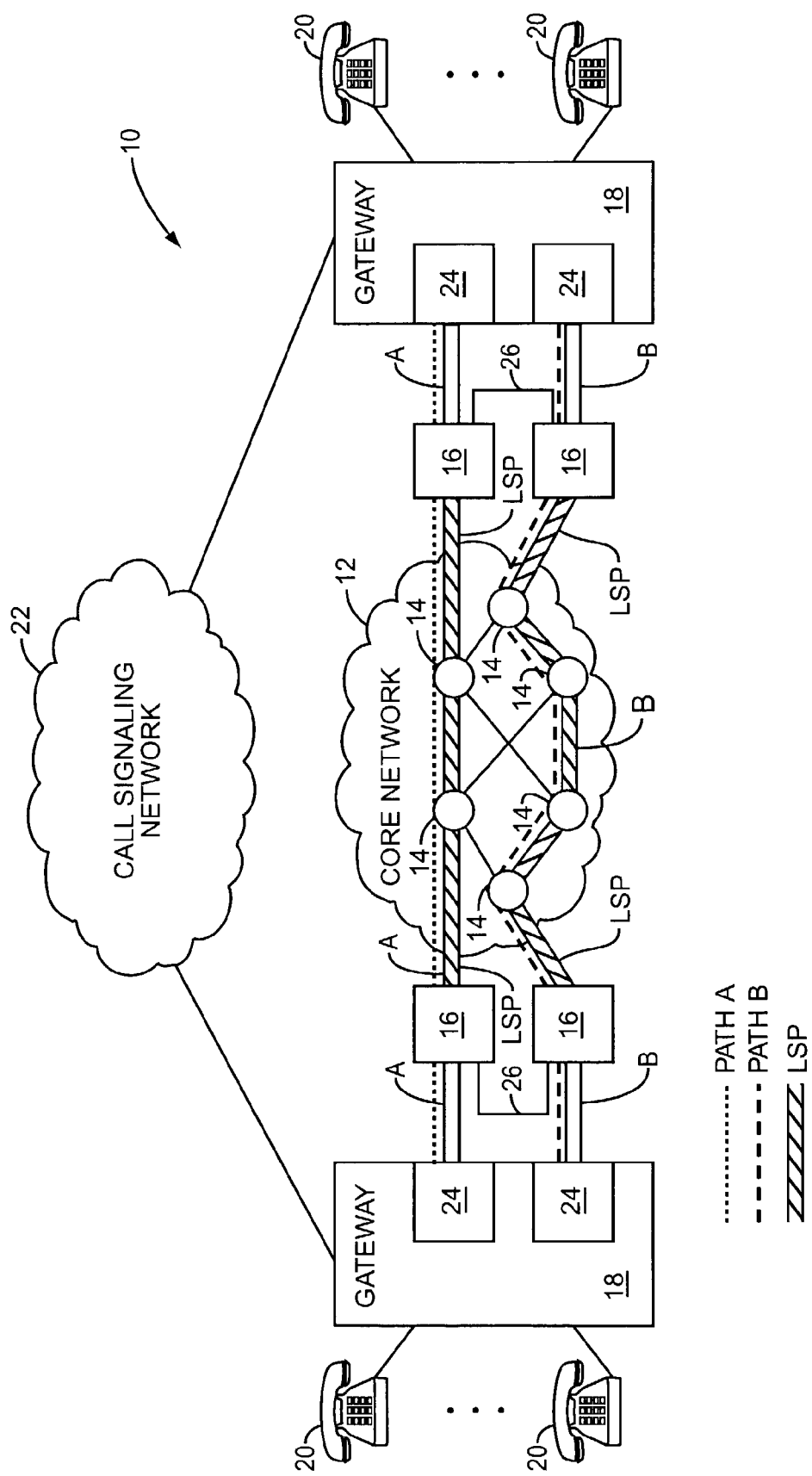
FIG. 4 is a block representation of the communication network infrastructure of FIG. 1 depicting redundant communication paths for a given media flow according to one embodiment of the present invention.

With reference to FIG. 4, assume the routers 14 in the core network 12 and the edge routers 16 cooperate to provide a multi-protocol label switching (MPLS) architecture. In an MPLS architecture, labels are appended to data packets being transferred from one edge router 16 to another via routers 14 in the core network 12. The labels define a particular label-switched path (LSP) over which the data packet should travel from one edge router 16 to another. Notably, the LSP can carry data for numerous gateways 18 at any given time. In this embodiment, assume the edge routers 16 are label edge routers (LERs), and that the routers 14 in the core network 12 are label switch routers (LSRs). When packets enter an MPLS architecture, the LERs look at the destination for the packet and any other packet attributes and assign the packet a label. The LERs then assign the data packet to a corresponding LSP, and it is sent to a first LSR in the assigned LSP. Each LSR along the LSP will forward the data packet along the LSP based on the label, until the packet reaches a destination LER, which will remove the label and route the packet to an appropriate media gateway 18.

As the packets travel along the LSP, the LSRs may simply monitor the label and forward the packet and label untouched, or may replace the label with a new label to facilitate routing or switching along the LSP. Each LSR will include routing tables based on the labels. Thus, LSPs extend between LERs, which are identified by labels. The LERs assign, add, and remove labels as traffic enters or exits the MPLS architecture. The MPLS architecture allows the establishment of LSPs having a defined bandwidth reserved for the specified traffic source. Those skilled in the art will be familiar with the concepts of establishing LSPs in an MPLS architecture. In the preferred embodiment, the LSPs are provisioned by an operation system or network provisioning tool based on constraints provided by the network operator. In practice, a bi-directional packet flow between LERs requires two unidirectional LSPs—one LSP for each direction. Both LSPs forming part of a single communication path preferably share common routing throughout the core network 12. For the purposes of clarity, it is assumed that each bi-directional LSP includes two unidirectional LSPs to facilitate bi-directional communications.

In one embodiment of the present invention, two LSPs are established between a first LER (edge router 16) and a second LER (edge router 16) using different communication interfaces 24, as illustrated in FIG. 4. The LSP preferably has a defined bandwidth and provides controlled access. One method to control access and not exceed the capacity of the LSP is to use a virtual, packet-based trunk group mapped to correspond to the LSP. As such, the LSP is engineered and provisioned with a guaranteed bandwidth matching the virtual trunk group size. For further information related to controlled access and virtual trunk groups, U.S. patent application No. 60/367,676 filed Mar. 26, 2002 and U.S. patent application Ser. No. 10/175,122 filed Jun. 19, 2002 are incorporated herein by reference in their entireties. The shaded line overlaying the LSP represents the virtual trunk group extending between the LERs provided by the edge routers 16. Individual media flows are setup dynamically by the media gateway controller between the gateways 18 and the LERs provided by the edge routers 16. Each individual media flow represents a bi-directional communication. The media gateways 18 will provide an interface between a traditional telephony interface associated with a telephone 20 or like device and an individual media flow.

The packets associated with individual media flows are sent back and forth between the gateway 18 and one of the LERs provided by the edge routers 16 over the remainder of paths A and B. Accordingly, the individual media flows feed into a virtual trunk group supported by a pair of LSPs at the LERs provided by the edge routers 16. For example, individual real-time protocol (RTP) voice over IP streams generated at the media gateway 18 are sent to the LER and form a media flow. The LER will assign a label to the packets forming the media flow, and based on the label, route the packet to an LSR provided by a router 14 associated with the LSP. In converse, packets coming in over a virtual trunk group from an LSP into the LER will have their labels removed, and will be routed over an individual media flow to the appropriate media gateway 18, which will convert the packets into TDM streams, or the like, to facilitate telephony communications.

The individual media flows on either side of the LSP for a call are set up under the control of the media gateway controllers using an appropriate call processing or media session control protocol, such as the session initiation protocol for trunking (SIP-T) or Bearer Independent Call Control (BICC), which are familiar to those skilled in the art. Thus, the media gateway controllers will cooperate with each other or with call processing entities in the PSTN to facilitate a call between telephones 20 supported by different gateways 18. Standard telephony interfaces are used between the telephones 20 and the gateways 18, wherein a packet-based media session is established between the respective gateways 18.

The present invention creates redundant paths A and B between gateways 18 using separate interfaces 24. The paths A and B are isolated from one another such that a failure on one path will not impact the other. As noted, the portion of paths A and B extending through the core network 12 between the routers 16 are created using an LSP. The portion of paths A and B between the routers 16 and the interfaces 24 of the gateways 18 may be a physical link carrying multiple media flows or like connection.

To control communications over paths A and B, the present invention generally selects one of the paths A and B for a given media flow as a primary path to transmit and receive packets and uses the other path as a backup path in case the primary path fails. Since the gateways 18 have redundant communication interfaces 24 associated with the different paths A and B, the gateway 18 can monitor the receipt of streaming packets over one path, and if the stream of incoming packets is broken, automatically begin transmitting packets for the communication session over the redundant path. Preferably, the media gateway 18 will also begin listening for packets to be received over the redundant path when a failure occurs on the primary path. Thus, a fast and efficient fail-over mechanism to the redundant path is made possible. The gateways 18 on either end of the communication session operate in the same manner so if the failure interrupts the media flow in both directions, both gateways 18 will react at the same time and in the same way, by switching to the alternate path. If the failure is unidirectional, only one gateway 18 will detect the absence of media flow and will trigger the switchover of its own transmission to the alternate path. Thus, the other gateway 18 will detect that packets are not being transmitted by the first gateway 18 over the primary path and will also switch over to the redundant path for receiving and transmitting packets. The fail-over scheme of the present invention does not require extra signaling either in the media flow path or externally from the call signaling network 22.

Since there are redundant paths for communication between the two gateways 18, the opposing gateways 18 for a communication session must synchronize to a primary path by selecting path A or B as the primary path. In general, one gateway 18 takes a role as a master gateway, while the other assumes the role of a slave gateway. In one embodiment, the call server determines which gateways 18 will be the master and slave gateways. In operation, the master gateway 18 will begin transmitting on one path, and the slave gateway 18 will determine which path is being used by the master gateway 18 and begin receiving and transmitting packets over the path selected by the master gateway 18. In select embodiments, each gateway 18 can monitor the primary and redundant paths for packets to decrease synchronization times as well as fail-over times.

Further, each pair of edge routers 16 associated with a gateway 18 may be connected with a cross link 26 as described in association with FIG. 1. The cross link 26 is beneficial to allow temporary re-routing of packets when there is a failure between one of the edge routers 16 and the gateway interface 24. When there is such a failure, the edge router 16 associated with the failure can re-route packets in transit to the edge router 16 having an operable connection to an interface 24. As such, the gateway 18 can receive the packets in transit for processing. The fail-over process will also work, in that the gateway 18 will recognize that packets are not being received over the failed path and then fail over to the operable path. The remote gateway 18 will follow suit and communications will switch from the primary path to the redundant path, and will not require communications over the cross link 26 once the fail-over process is complete.

Figure 5:
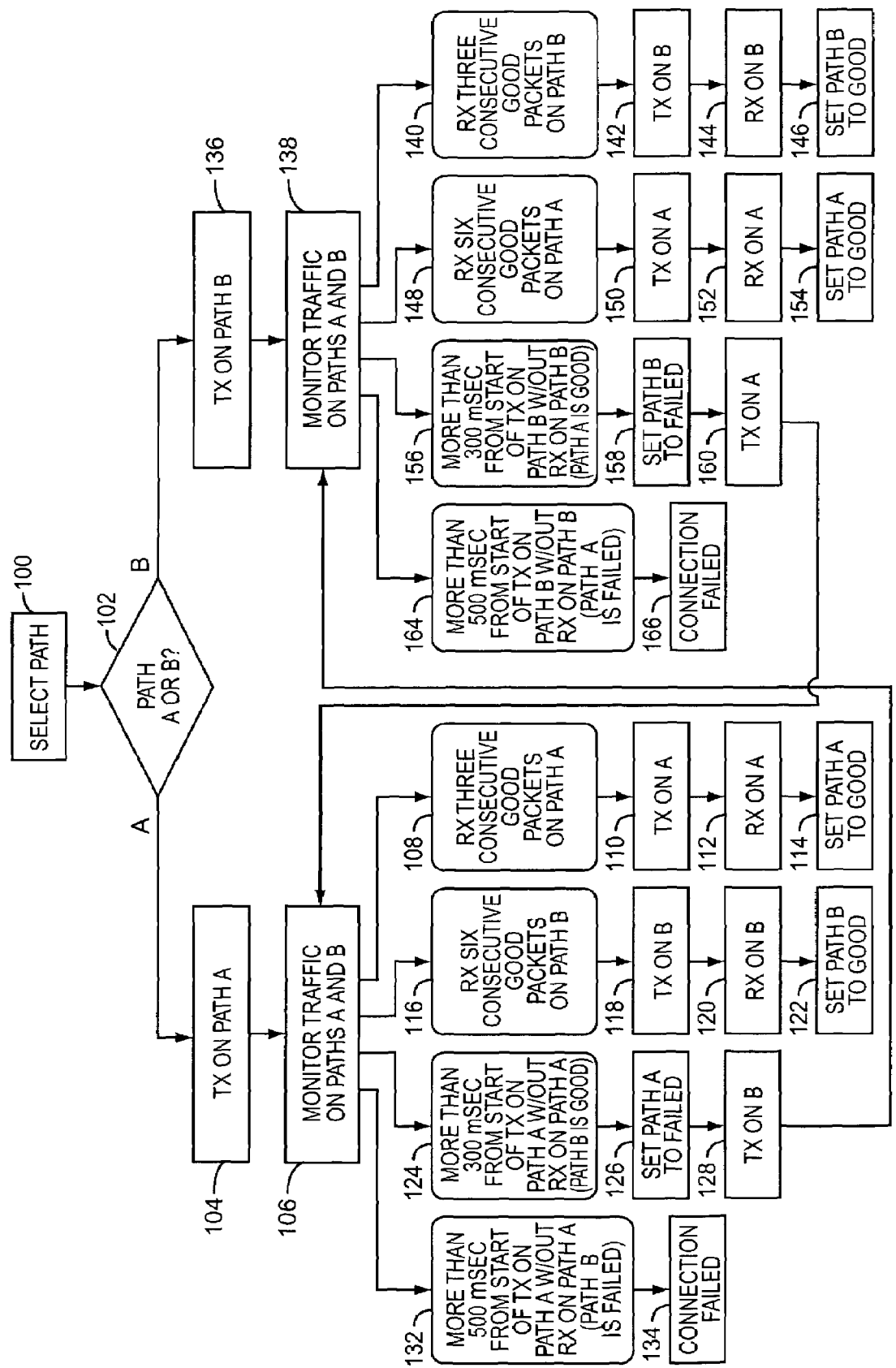
FIG. 5 is a flow diagram illustrating an exemplary synchronization process for a master gateway according to one embodiment of the present invention.

An exemplary synchronization process is illustrated by the flow diagram of FIG. 5. Initially, the master gateway 18 will select a path (step 100) to facilitate communications. Path selection may be used to perform load sharing over the primary and redundant paths in the absence of a failure by using a suitable path selection algorithm. If the selected path is path A (step 102), the master gateway 18 will transmit packets on path A (step 104) and monitor for incoming packets on at least path A and optionally both paths A and B (step 106). The master gateway 18 will also monitor for several conditions, which will bear on the operation of the master gateway 18 and the path to transmit and receive traffic. For a first condition of the exemplary synchronization process with respect to FIG. 5, the master gateway 18 will determine if three consecutive packets are received on path A and that the packets are valid packets (condition 108). If three consecutive packets are received on path A, the master gateway 18 will continue to transmit on path A (step 110), receive packets on path A (step 112), and set a register indicating path A is properly operating and that the media session has been successfully established with the slave gateway (step 114).

For a second condition, the master gateway will determine if six consecutive packets are received on path B and that the packets are valid packets (condition 116). If six consecutive packets are received on path B, the master gateway 18 will start transmitting on path B (step 118), receive packets on path B (step 120), and set a register indicating path B is properly operating and that the media session has been successfully established with the slave gateway (step 122). Preferably, the master gateway 18 requires the receipt of more consecutive packets to switch paths than to stay on the current path. As such, in the example of FIG. 5, only three consecutive packets on path A are required to stay on path A while six consecutive packets must be received on path B to switch from path A to path B.

The master gateway 18 will also monitor the time since packet transmission started on path A. If no packet has been received on path A for a time which is greater than a fixed time, such as 300 milliseconds, and path B appears operable (condition 124), the master gateway 18 will set a register indicating path A has failed (step 126), begin transmitting on path B (step 128), and transition to monitor traffic on paths A and B (step 138)

The master gateway 18 may also monitor the time since packet transmission started on path A. If no packet has been received on path A for a time which is greater than a fixed time, such as 500 milliseconds, and path B is already marked as failed (condition 132), the master gateway 18 will indicate that the connection failed and take the appropriate steps to alert other network devices of the failed connection (step 134).

The above process allows the master gateway 18 to synchronize with the slave gateway 18. The process is analogous if the master gateway 18 chooses to use path B instead of path A in step 102. Thus, steps 136-166 are analogous to steps 104-134, and are presented to provide a full overview of the processing for each path.

Figure 6:
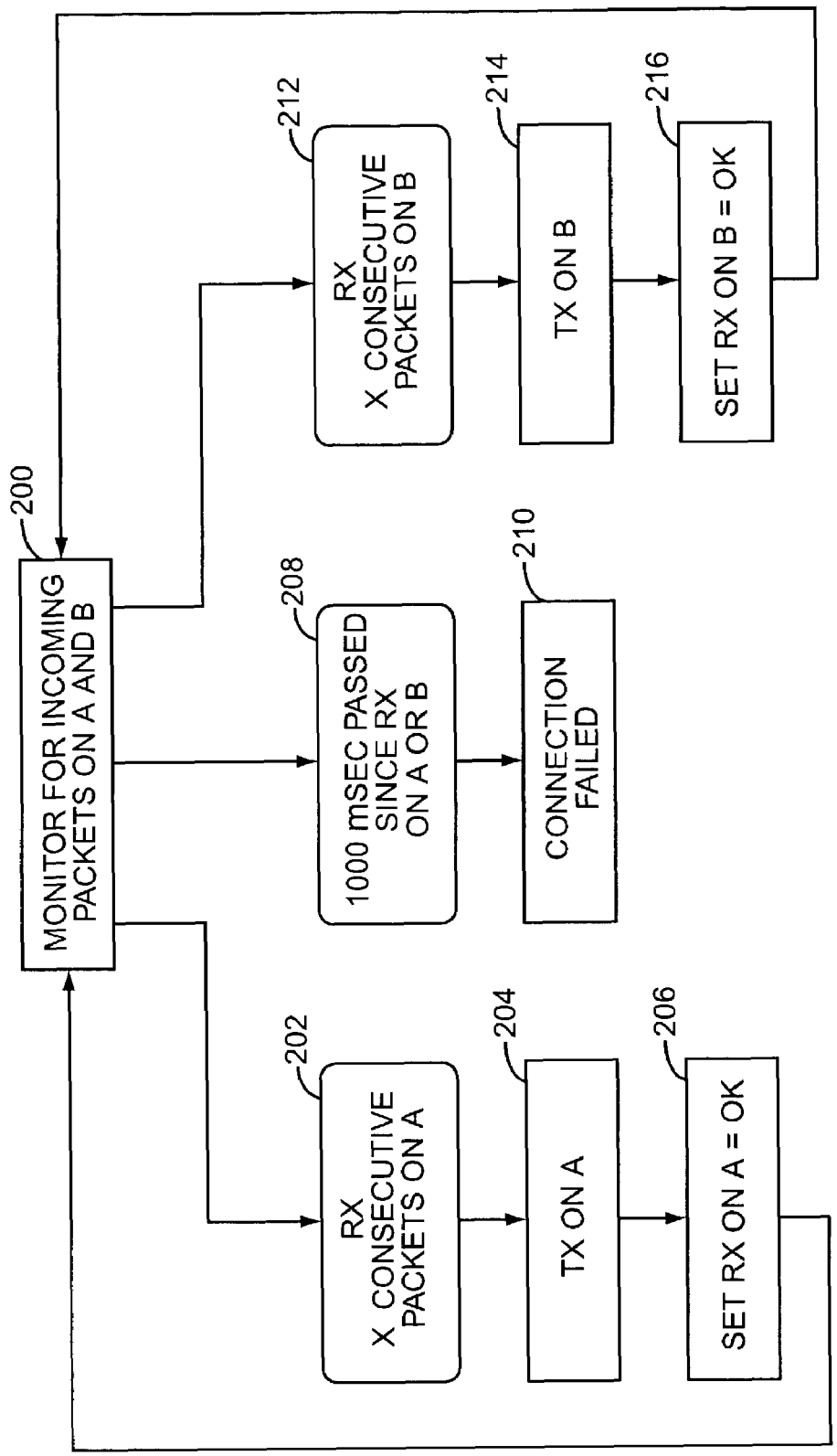
FIG. 6 is a flow diagram illustrating an exemplary synchronization process for a slave gateway according to one embodiment of the present invention.

With reference to FIG. 6, the synchronization process for the slave gateway 18 is illustrated. Initially, the slave gateway 18 will monitor for incoming packets on paths A and B (step 200). If the slave gateway 18 determines that it is receiving packets on path A, it will determine if X consecutive valid packets, such as three, are received (condition 202). If X consecutive valid packets are received, the slave gateway 18 will transmit on path A (step 204) and set a register indicating that it can properly receive on path A (step 206), indicating that the media session has been successfully established with the master gateway. If after a fixed amount of time, such as 1,000 msec, X consecutive valid packets are not received (condition 208), the slave gateway 18 will indicate that the connection failed and take the appropriate steps to alert other network devices of the failed connection (step 210). If the slave gateway 18 determines that it is receiving packets on path B, it will determine if X consecutive valid packets are received (condition 212). If X consecutive valid packets are received, the slave gateway 18 will transmit on path B (step 214) and set a register indicating that it can properly receive on path B (step 216), indicating that the media session has been successfully established with the master gateway.

Figure 7:
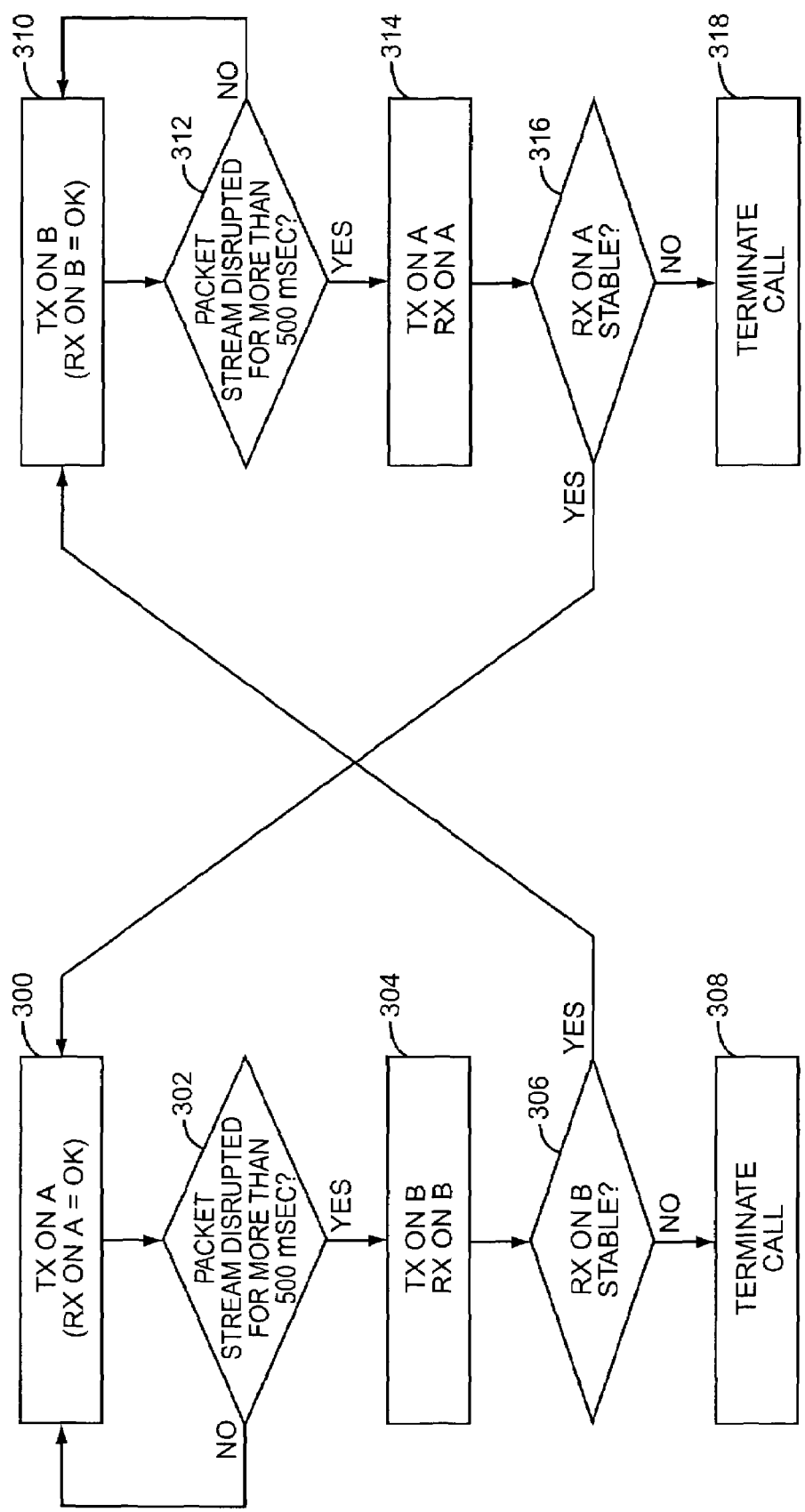
FIG. 7 is a flow diagram illustrating an exemplary failure recovery process for a gateway according to one embodiment of the present invention.

With reference to FIG. 7, a fail-over process is illustrated for either the master or slave gateway 18. Since packets are normally sent in a continuous stream, the present invention may be configured to fail-over to an alternate path when a break in the streaming occurs. However, select systems may provide for call functions that either stop the stream or cause significant breaks in the stream during normal operation. For example, to implement certain telephony services such as call waiting, a gateway may be placing a call on hold, which may entail stopping packet flow or reducing the number of packets being sent while the call is on hold. In one embodiment of the present invention, a first gateway 18 providing the hold function may be configured to provide a periodic "stay-alive" packet to a second gateway 18, which is configured to recognize the "stay-alive" packet and prevent the normal switching to an alternate path due to the break in streaming.

As part of the connection setup, information may be exchanged between the gateways 18 identifying how often the "stay-alive" packet will be transmitted. In one embodiment, this information is communicated as part of the media session establishment between media gateway controllers. This new attribute is added to the session description protocol in addition to the IP addresses, available CODECs, etc. If the attribute is not provided during setup, the receiving gateway 18 can assume the other gateway 18 does not have such capability and will simply not implement the switchover mechanism described in this invention. The "stay-alive" packet can be simply an RTP packet with null information or an RTCP packet as defined in the Internet Engineering Task Force's Request for Comments (RFC) 1889, which is incorporated herein by reference in its entirety.

Turning to FIG. 7, assuming that both gateways 18 are set up for expecting and handling "stay-alive" packets and communications are synchronized and occurring on path A, a first gateway 18 will continue to transmit on path A as long as it is receiving on path A (step 300). The gateway 18 will determine if the incoming packet stream is disrupted for more than a fixed amount of time, such as 500 milliseconds (step 302), this threshold selected to be greater than the "stay-alive" packet interval and preferably two or three times this interval to allow for potential loss of one of these "stay-alive" packets. If the packet stream is disrupted, the gateway 18 will immediately begin transmitting on path B (step 304) and begin monitoring for incoming packets on path B (step 306) to try to reestablish the connection with the remote gateway. The gateway 18 will wait a fixed amount of time, such as three seconds, expecting packets on path B. If the reception is not stable, it is likely that both paths A and B are down, and the call is terminated (step 308). If the connection is reestablished successfully on path B, the gateway 18 will transition to a new stable state receiving and transmitting on path B (step 310) such that if a new failure was to occur, the recovery steps would be taken again. As with the above, steps 310-318 are analogous to steps 300-308 for communications initiating on path B. In general, if a gateway 18 does not receive packets for a defined amount of time on a primary path, the gateway 18 will begin transmitting packets on the redundant path and will listen for packets to be received over the redundant path. The remote gateway 18 will do the same, and as such, will immediately follow suit and fail over to the redundant path in a quick and efficient manner.

Figure 8:
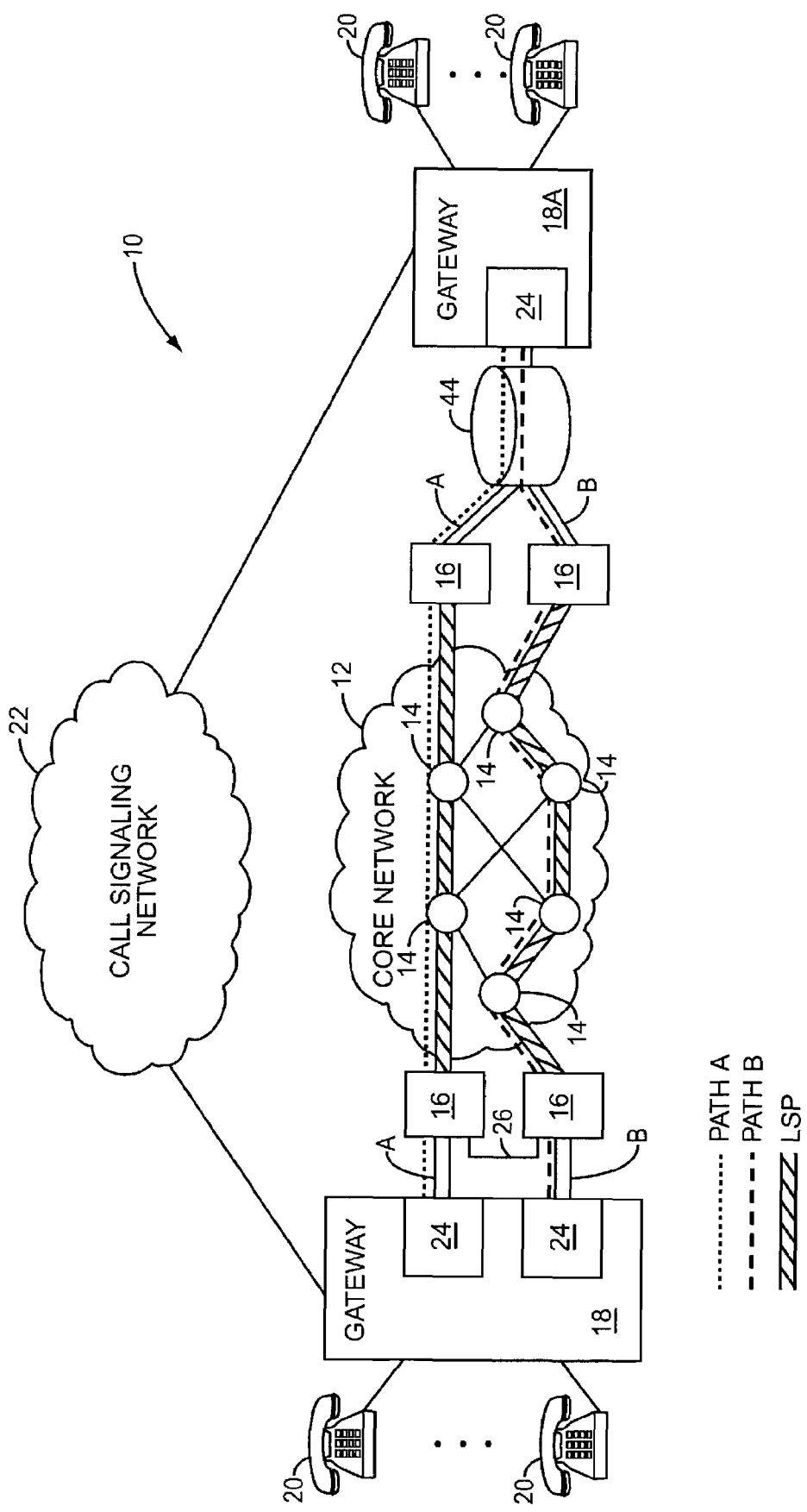
FIG. 8 is a block representation of a communication network infrastructure according to one embodiment of the present invention.

With reference to FIG. 8, an alternative communication environment 10 is illustrated wherein one gateway 18 is constructed with redundant communication interfaces 24 and another gateway 18A has only a single interface 24 which interworks to both paths A and B via a router 44, which terminates both paths A and B. In such an embodiment, gateway 18 operates as described previously, providing protection against network failures. However, gateway 18A cannot perform or initiate path switching as it only has one network interface 24. The switching between paths A and B is instead facilitated by the router 44. Because the path failure detection done by the router 44 relies on routing protocols such as OSPF, failure detection and recovery for certain failure modes can take longer than when both gateways 18 support the current invention. To allow gateway 18 to do protection switching, it is preferable that gateway 18A support the "stay-alive" attribute mentioned earlier. With this, gateway 18 having the redundant interfaces 24 operates in the same manner as that described above without requiring knowledge of the configuration and operation of gateway 18A.

Figure 9:
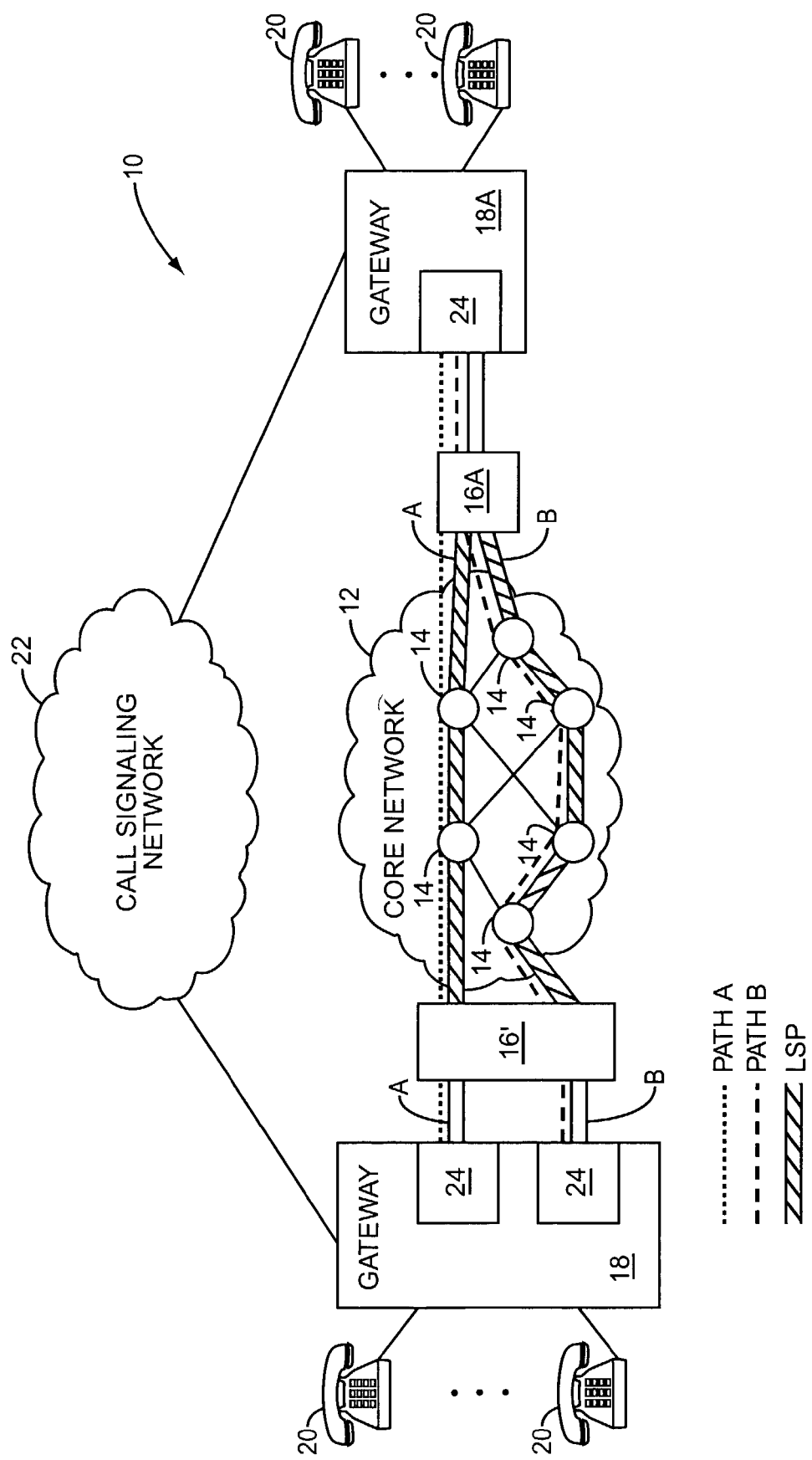
FIG. 9 is a block representation of a communication network infrastructure according to one embodiment of the present invention.

With reference to FIG. 9, gateway 18A may be associated with a single label edge router 16A instead of the router 44, wherein the label edge router 16A will terminate both paths A and B and facilitate fail-over under the control of gateway 18. In this configuration, edge router 16A is preferably constructed using redundant hardware, failsafe software and various recovery mechanisms to provide continuous operation even under failure. Similarly, gateway 18 can be interfacing to a single, redundant edge router 16', which still supports both LSPs and both paths.

Those skilled in the art will recognize that the label switch paths are simply one way to facilitate a reserved path to define a communication path. Permanent virtual circuits on an asynchronous transfer mode (ATM) network and the like may also be used, in addition to any number of other ways to define a communication path in a packet-switched network.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    a) facilitating a bi-directional streaming communication session with a remote gateway via a first communication path;
    b) transmitting packets to the remote gateway over the first communication path via a first interface;
    c) receiving packets from the remote gateway over the first communication path via the first interface;
    d) detecting an interruption of packets being received over the first communication path from the remote gateway; and
    e) upon detecting the interruption of packets being received over the first communication path:
        i) transmitting packets to the remote gateway over a second communication path via a second interface; and
        ii) receiving packets from the remote gateway over the second communication path via the second interface.

2. The method of claim 1 further comprising synchronizing transmission and reception of packets with the remote gateway over either the first or second communication paths.

3. The method of claim 2 wherein the synchronizing step comprises:
    a) monitoring the first and second paths for packets to receive;
    b) identifying one of the first and second paths over which packets are being received; and
    c) transmitting packets over the one of the first and second paths over which packets are being received.

4. The method of claim 3 wherein the identifying step comprises determining if a defined number of consecutive valid packets are received over the first or second paths prior to identifying the one over which packets are being received reliably.

5. The method of claim 2 further comprising monitoring for reception of packets on the second communication path when the communication session is occurring on the first communication path.

6. The method of claim 1 wherein the first and second communication paths are at least partially supported by a label switched path provided by an MPLS network.

7. The method of claim 1 wherein the first and second communication paths are at least partially supported by a permanent virtual circuit provided by an ATM network.

8. The method of claim 1 wherein the streaming communication session relates to at least one of the group consisting of video conferencing, audio streaming, video streaming, information streaming, voicemail, gaming, advertising, and screen sharing applications.

9. The method of claim 1 further comprising load sharing across the first and second communication paths.

10. The method of claim 1 further comprising receiving a message from a call control entity and assuming either a master or slave role based on the message.

11. The method of claim 1 further comprising:
    a) receiving information indicating that the remote gateway supports a stay alive packet sent periodically; and
    b) forgoing switching from the first communication path to the second communication path if no such information is received.

12. A media gateway comprising:
    a) a first interface for supporting bi-directional communications with a remote gateway via a first communication path;
    b) a second interface for supporting bi-directional communications with the remote gateway via a second communication path;
    c) a media interface supporting bi-directional communications with a network or endpoint;
    d) a control system associated with the first, second, and media interfaces and adapted to:
        i) facilitate a bi-directional streaming communication session with the remote gateway via the first communication path;
        ii) transmit packets to the remote gateway over the first communication path via the first interface;
        iii) receive packets from the remote gateway over the first communication path via the first interface;
        iv) detect an interruption of packets being received over the first communication path; and
        v) upon detecting an interruption of packets being received over the first communication path:
            A) transmit packets to the remote gateway over the second communication path via the second interface; and B) receive packets from the remote gateway over the second communication path via the second interface.

13. The media gateway of claim 12 wherein the control system is further adapted to operate independently in association with a plurality of media sessions associated with a plurality of remote gateways.

14. The media gateway of claim 12 wherein the control system is adapted to synchronize transmission and reception of packets with the remote gateway over either the first or second paths.

15. The method of claim 14 wherein to synchronize transmission and reception, the control system is further adapted to:
   a) monitor the first and second communication paths for packets to receive;
   b) identify one of the first and second communication paths over which packets are being received; and
   c) transmit packets over the one of the first and second communication paths over which packets are being received.

16. The media gateway of claim 15 wherein the control system is adapted to determine if a defined number of consecutive packets are received over the first or second communication paths prior to identifying the one over which packets are being received.

17. The media gateway of claim 14 wherein the control system is further adapted to monitor for reception of packets on the second communication path when the communication session is occurring on the first communication path.

18. The media gateway method of claim 12 wherein the first and second communication paths are at least partially supported by a label switched path provided by an MPLS network.

19. The media gateway of claim 12 wherein the first and second communication paths are at least partially supported by a permanent virtual circuit provided by an ATM network.

20. The media gateway of claim 12 wherein the streaming communication session relates to at least one of the group consisting of video conferencing, audio streaming, video streaming, information streaming, voicemail, gaming, advertising, and screen sharing applications.

21. The media gateway of claim 12 wherein the control system is further adapted to:
   a) receive information indicating that the remote gateway supports a stay alive packet sent periodically; and
   b) forgo switching from the first communication path to the second communication path if no such information is received.

22. The media gateway of claim 12 wherein the control system is further adapted to facilitate load sharing across the first and second communication paths.

23. The media gateway of claim 12 wherein the control system is further adapted to receive a message from a call control entity and assume either a master or slave role based on the message.

24. A system comprising:
   a) means for facilitating a bi-directional streaming communication session with a remote gateway via a first communication path;
   b) means for transmitting packets to the remote gateway over the first communication path via a first interface;
   c) means for receiving packets from the remote gateway over the first communication path via the first interface;
   d) means for detecting an interruption of packets being received over the first communication path; and
   e) upon detecting an interruption of packets being received over the first communication path:
      i) means for transmitting packets to the remote gateway over a second communication path via a second interface;
      ii) means for receiving packets from the remote gateway over the second communication path via the second interface.

25. The system of claim 24 further comprising means for synchronizing transmission and reception of packets with the remote gateway over either the first or second communication paths.

26. The system of claim 25 wherein the means for synchronizing further comprises:
   a) means for monitoring the first and second communication paths for packets to receive;
   b) means for identifying one of the first and second communication paths over which packets are being received; and
   c) means for transmitting packets over the one of the first and second communication paths over which packets are being received.

27. The system of claim 26 wherein the means for identifying further comprises means for determining if a defined number of consecutive packets are received over the first or second communication paths prior to identifying the one over which packets are being received.

28. The system of claim 25 further comprising means for monitoring for reception of packets on the second communication path when the communication session is occurring on the first communication path.

29. The system of claim 24 wherein the first and second communication paths are at least partially supported by a label switched path provided by an MPLS network.

30. The system of claim 24 wherein the first and second communication paths are at least partially supported by a permanent virtual circuit provided by an ATM network.

31. The system of claim 24 wherein the streaming communication session relates to at least one of the group consisting of video conferencing, audio streaming, video streaming, information streaming, voicemail, gaming, advertising, and screen sharing applications.

32. The system of claim 24 further comprising:
   a) means for receiving information indicating that the remote gateway supports a stay alive packet sent periodically; and
   b) means for forgoing switching from the first communication path to the second communication path if no such information is received.

* * * * *